(12) United States Patent
Wescombe

(10) Patent No.: US 6,226,911 B1
(45) Date of Patent: May 8, 2001

(54) TAG

(76) Inventor: Graeme Leslie James Wescombe, 43 Barbara Street, Manly West, Queensland, 4179 (AU)

(*) Notice: Subject to any disclaimer, the term of this patent is extended or adjusted under 35 U.S.C. 154(b) by 0 days.

(21) Appl. No.: 08/977,857

(22) Filed: Nov. 25, 1997

(30) Foreign Application Priority Data

Nov. 29, 1996 (AU) .................................................. P03895

(51) Int. Cl.$^7$ .................................................. G09F 3/00
(52) U.S. Cl. .................................. 40/668; 40/637; 40/300
(58) Field of Search .............................. 40/637, 668, 662, 40/300, 305, 661.11; 29/432

(56) References Cited

U.S. PATENT DOCUMENTS

| | | | |
|---|---|---|---|
| 310,785 | * | 1/1885 | Brewster .............................. 40/668 X |
| 847,469 | * | 3/1907 | Graham .................................... 40/637 |
| 1,248,047 | * | 11/1917 | Woolley .............................. 40/668 X |
| 2,554,105 | * | 5/1951 | Heinle .................................... 40/662 |
| 3,067,534 | * | 12/1962 | Paxton .................................... 40/646 |
| 3,721,028 | * | 3/1973 | Lehner .................................... 40/668 |
| 3,765,113 | * | 10/1973 | Magee .................................... 40/300 |
| 3,772,809 | * | 11/1973 | Schneller .............................. 40/637 |
| 3,788,278 | | 1/1974 | Propst et al. . |
| 3,952,438 | | 4/1976 | Propst et al. . |
| 3,978,188 | * | 8/1976 | Schoenebeck ...................... 29/432 X |
| 4,149,329 | * | 4/1979 | Graves .................................... 40/668 |
| 4,750,284 | | 6/1988 | Parry et al. . |
| 5,279,420 | * | 1/1994 | Rodgers .............................. 40/668 X |
| 5,461,806 | | 10/1995 | Bristow, Jr. . |
| 6,007,548 | * | 12/1999 | Ritchey .............................. 40/300 X |
| 6,055,752 | * | 5/2000 | Ritchey .............................. 40/668 X |
| 6,085,453 | * | 7/2000 | Volk .................................... 40/637 X |
| 6,098,324 | * | 8/2000 | Nepote .............................. 40/300 X |

FOREIGN PATENT DOCUMENTS

| | | | |
|---|---|---|---|
| 1361444 | * | 4/1964 | (FR) ........................................ 40/668 |
| 1171611 | | 11/1969 | (GB) . |
| 9101468 | | 8/1991 | (NL) . |
| 145800 | | 7/1970 | (NZ) . |
| 155896 | | 5/1972 | (NZ) . |
| 168382 | | 12/1975 | (NZ) . |
| 177112 | | 10/1976 | (NZ) . |
| 178156 | | 12/1977 | (NZ) . |

* cited by examiner

*Primary Examiner*—Terry Lee Melius
*Assistant Examiner*—Robert G. Santos
(74) *Attorney, Agent, or Firm*—Renner, Otto, Boisselle & Sklar LLP

(57) ABSTRACT

A planar tag having an attachment portion and a body portion is disclosed. The attachment portion has at least one barb and the body portion being printable or carrying indicia. A tool for anchoring the tag to an object and an apparatus for holding the object whilst the tag is secured to the object are also disclosed.

9 Claims, 9 Drawing Sheets

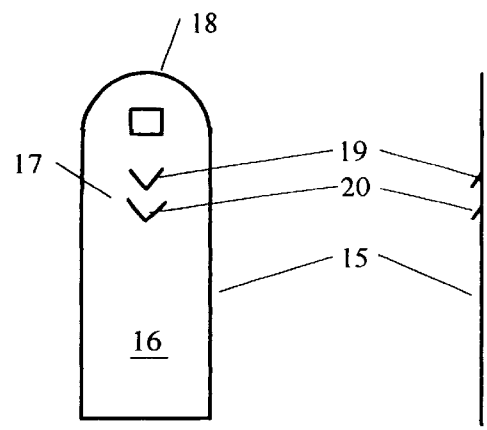
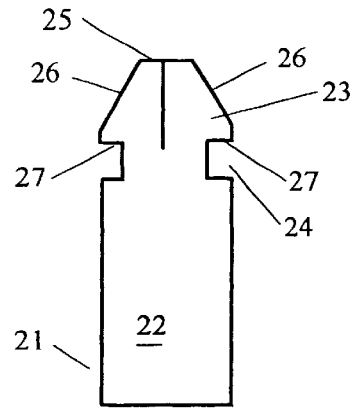
FIG 1B  FIG 1A  FIG 2A
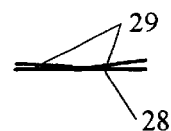
FIG 2B
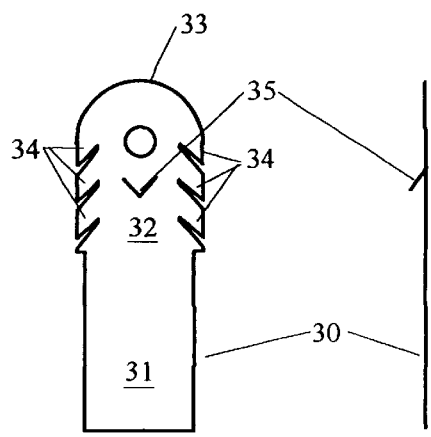
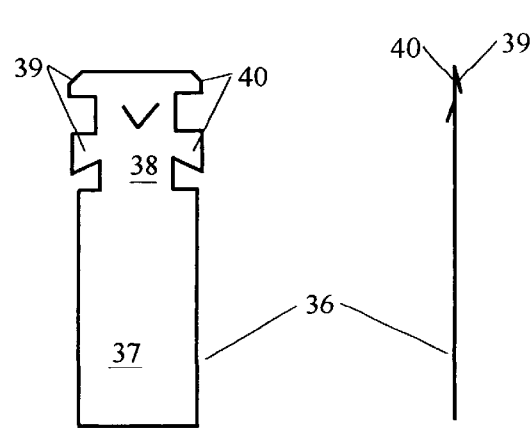
FIG 3A  FIG 3B  FIG 4A  FIG 4B

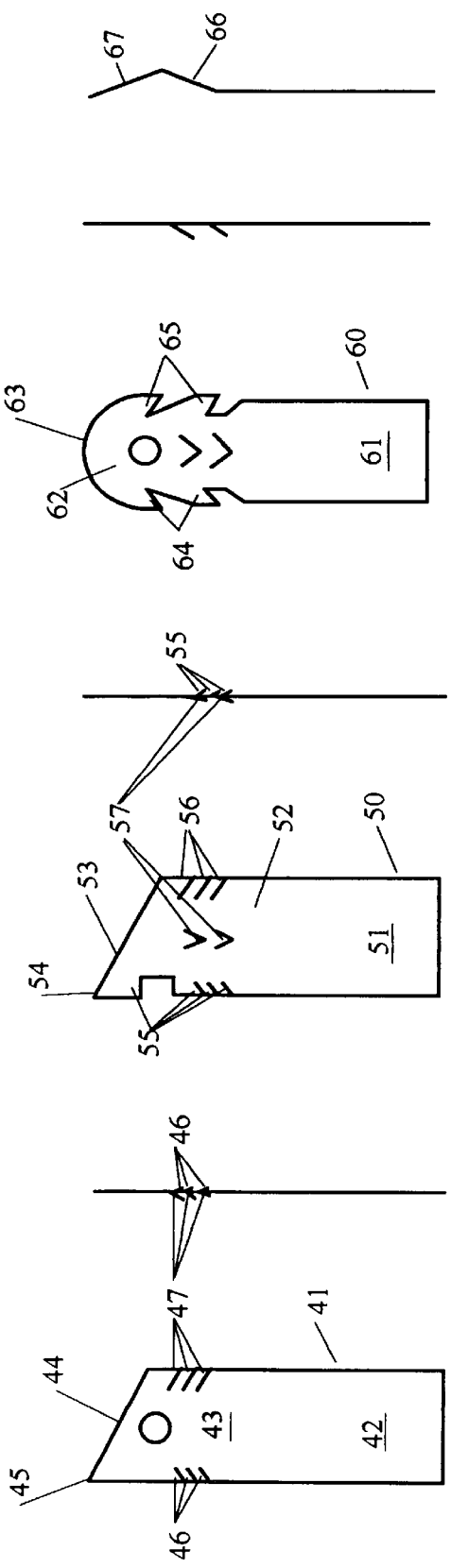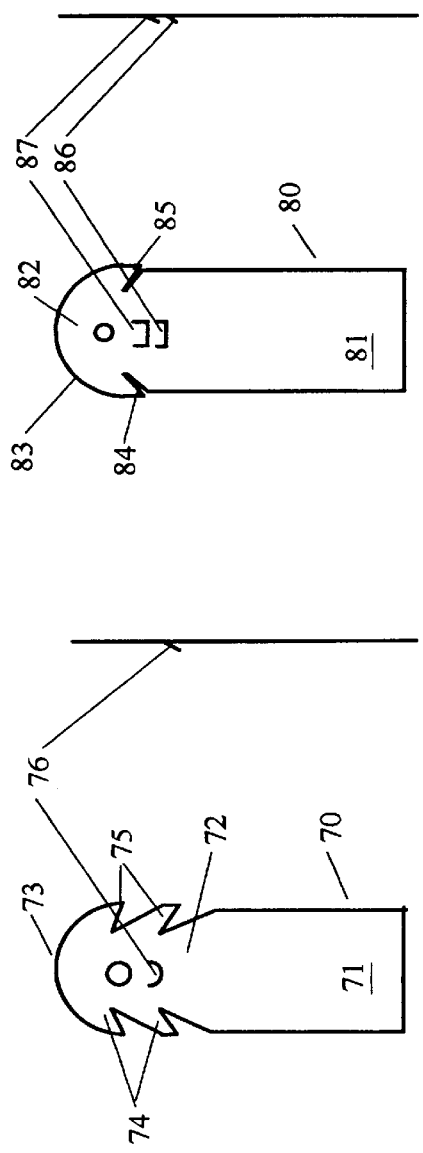

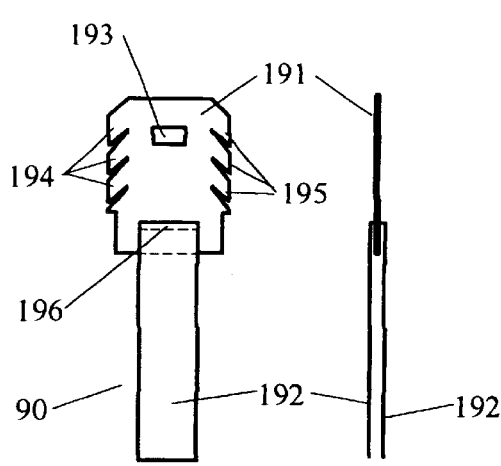
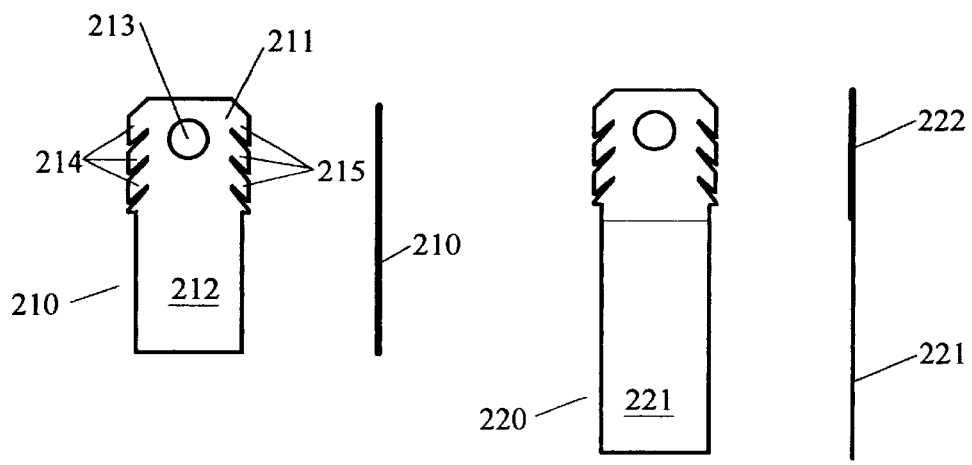
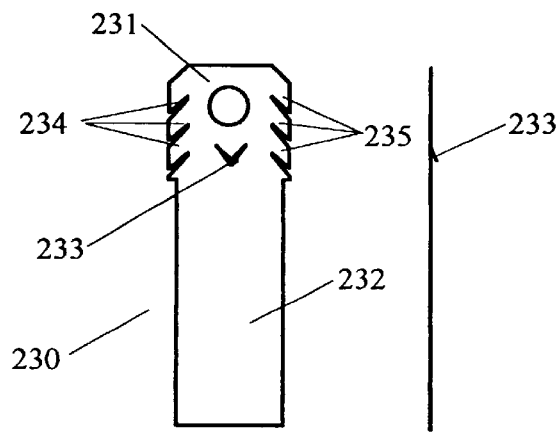
FIG 16 A  FIG 16 B  FIG 17 A  FIG 17 B
FIG 18 A  FIG 18 B  FIG 19 A  FIG 19 B
FIG 20 A  FIG 20 B

TAG

BACKGROUND OF THE INVENTION

THIS INVENTION relates to a tag and a method of securing it to an object. In particular, the invention concerns a tag which may be applied to an object such as meat products, hides and skins, and other articles.

The invention will be described by way of example with reference to the application of the tag to skins and hides. It should be appreciated that this is by way of example only, and that the tag of the invention may also be applied to other articles.

In the processing of animal carcasses in abattoirs, there is a need for identifying the particular carcass from which skin or hide originates Such identification allows for quality assurance procedures to be implemented and for products such as hides to be sold at their true value. In addition, during the course of slaughtering animals, it is often necessary to be able to accurately determine the particular carcass from which cuts of meat originate. This is also desirable from the point of view of quality assurance procedures.

It has become the practice to label cuts of meat or hides with labels or tags carrying indicia such as bar codes or the like. These labels were either pre-printed, or printed on site. Typically, these labels were secured to the cut of meat or hide by first cutting the meat or the hide and then attaching the label with a loop extending through the cut and as a consequence, the loop which secures the label in place, is accessible from one or other or both sides of the cut of meat or hide. The incision in the cut of meat or hide was usually made by one person and another person would be responsible for attaching the label and it was often difficult for that person to locate the incision previously made.

The labels employed typically consisted of a thin plastic tag inserted into and extending through the cut of meat or hide and in some instances, rather than being attached as described above, were secured to the cut of meat or hide by employing a needle gun. If these tags were not completely removed from the cut of meat, portions of the tag often remained in the meat product and this could cause problems for the consumer.

Where the tags were secured to skins or hides while the skin was still green or unprocessed, it was necessary to remove the tag to allow the hide to be defleshed to remove the flesh remaining on the hide before the hide could be further processed. This defleshing operation uses rotating roller blades to remove flesh and fat from the hide and if the tag was not removed before this process was carried out, the fleshing process would sever the tag from the hide. In any event, after the fleshing operation, tags would need to be re-secured to the hide, so that each hide could readily be identified with a particular carcass.

The tags or labels were typically made from a variety of materials including paper, woven cloth, thin sheets of plastic, or thin sheets of gelatin or collagen.

SUMMARY OF THE INVENTION

It is an object of the present invention to provide a label or tag and a method for securing such a tag to an article which at least minimise the disadvantages referred to above.

According to one aspect, there is provided a label or tag having a body portion adapted to carry indicia either pre-printed onto the body portion, or applied to the body portion once the tag is attached to an object, and an attachment portion co-planar with and at one end of the body portion, the attachment portion having at least one barb extending therefrom for allowing the tag to be secured to the object with the attachment portion embedded into the object.

According to another aspect of the invention, there is provided a method of securing the tag referred to above to an object, the method including supporting the object against movement providing a slit in the object to which the tag is to be secured, inserting the attachment portion into the slit and slightly withdrawing the tag from the slit so that the barb engages the object to anchor the tag to the object.

According to another aspect of the invention, there is provided a tool for inserting the tag mentioned above into an object, the tool having a blade at one end and means for releasable holding the tag whereby the blade may be employed to form a slit in an object to which the tag is to be secured and when the blade is withdrawn from the slit, the tag is released from the tool and is anchored to the object.

In one embodiment, the body is substantially planar and relatively thin and is adapted to carry indicia on at least one side face thereof. The attachment portion may form an extension to the body and is co-planar with the body. The tag may have opposed lateral side edges and if desired, these edges may be parallel to one another, although this is not necessary.

The attachment portion may terminate in a reduced width free end although the attachment portion may be of a width comparable to the width of the body of the tag.

Preferably, a plurality of barbs are present in the attachment portion. These barbs may extend at spaced intervals along one edge of the tag and the attachment portion. Alternatively, the barbs may extend along opposed edges of the attachment portion. In another embodiment, the barbs are located on the attachment portion but between opposed edges of the attachment portion. If desired, the attachment portion may be provided with barbs extending along one or both of the edges of the attachment portion, as well as having barbs located between edges of the attachment portion.

The barbs may have any convenient shape which ensures that they anchor relative to the object to which they are attached when the tag is slightly withdrawn from the slit in the object. Preferably, the barbs have a reduced width free end and are directed rearwardly of the attachment portion, away from the free end of the portion, and towards the body of the tag.

A tool may be employed for inserting the tag into the object. The tool locates onto and restrains the object to allow the tag to be inserted into the slit made into the object. Since the tag is inserted substantially laterally into the object and does not necessarily project through the object, it may remain in place during further processing of the article which may be necessary when the object under consideration, is a skin or hide. Since the tag projects laterally into the skin or hide, it is not prone to being inadvertently removed during the defleshing operation referred to above.

The tool may be manually operated or mechanically driven relative to the object to thereby anchor the tag relative to the object. In one embodiment the tool may have a holding member which releasably holds the tag to allow it to be anchored to the object. In one embodiment, the holding member may include a pin which releasably engages the tag.

In another embodiment, the tool releasably clamps onto the tag to releasably hold the tag to allow it to be anchored to the object.

BRIEF DESCRIPTION OF THE DRAWINGS

Particular preferred embodiments of the invention will now be described with reference to the drawings in which:

FIG. 1A is a side view of a tag according to one embodiment of the invention;

FIG. 1B is a front elevational view of the tag shown in FIG. 1A;

FIG. 2A is a front elevational view of a tag according to another embodiment of the invention;

FIG. 2B is an end view of the tag shown in FIG. 2A;

FIG. 3A is a front elevational view of a tag according to another embodiment;

FIG. 3B is a side view of the tag shown in FIG. 3A;

FIG. 4A is a front elevational view of another tag according to an embodiment of the invention;

FIG. 4B is a side view of the tag shown in FIG. 4A;

FIG. 5A is a front elevational view of a tag according to another embodiment of the invention;

FIG. 5B is a side view of the tag shown in FIG. 5A;

FIG. 6A is a front elevational view of a tag according to another embodiment of the invention;

FIG. 6B is a side view of the tag shown in FIG. 6A;

FIG. 7A is a front elevational view of another tag according to an embodiment of the invention;

FIG. 7B is a side view of one form of the tag shown in FIG. 7A;

FIG. 7C is a side view of another form of the tag shown in FIG. 7A;

FIG. 8A is a front elevational view of another tag according to an embodiment of the invention;

FIG. 8B is a side view of the tag shown in FIG. 8A;

FIG. 9A is a front elevational view of a tag according to another embodiment of the invention;

FIG. 9B is a side view of the tag shown in FIG. 9A;

As shown in FIGS. 1A and 1B, the tag 15 has a body 16 and an attachment portion 17 at one end of the body 16. The attachment portion has a rounded reduced width end 18 and two barbs 19 and 20 are present in the attachment portion. These barbs are produced in the attachment portion by slits formed in that portion and as shown in FIG. 1A, these barbs may be configured to extend from opposite side edges of the tag 15. The barbs 19 and 20 extend from the plane of the tag 15.

FIG. 2A of the drawings shows another tag construction. The tag 21 has a body 22 and an attachment portion 23. The attachment portion has a reduced width zone 24 adjacent one end of the body 22 and a reduced width end portion 25 spaced from the body 22. The attachment portion has diverging edges 26 which terminate in shoulder like barbs 27. As shown in FIG. 2B, the attachment portion consists of a first part 28 co-planar with the body 22 and a second portion 29 consisting of wings extending out of the plane of the body 22.

Figure 10A:
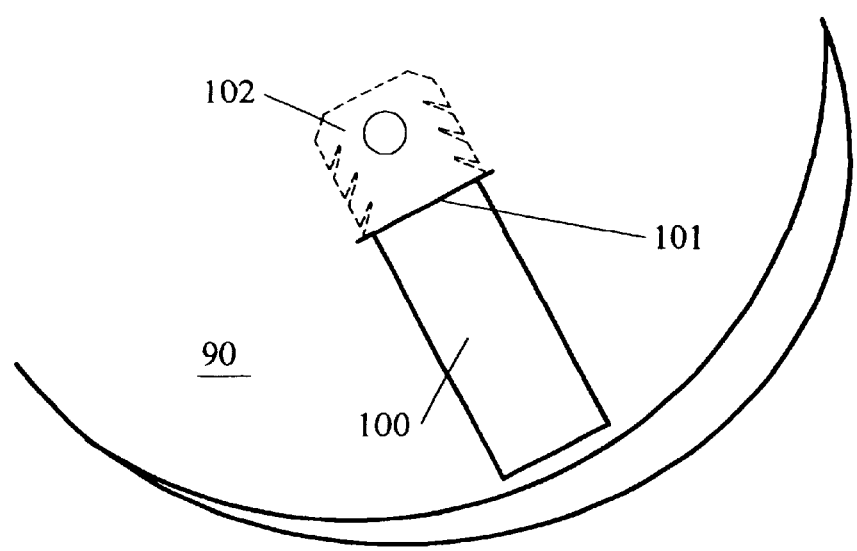
FIG. 10A is a perspective view of a tag secured to a hide or skin.

The tag 30 shown in FIGS. 3A and 3B, has a body 31 and a co-planar attachment portion 32. The attachment portion has a rounded free end 33. Barbs 34 extend from opposed edges of the body portion 32 and an additional barb 35 is located between opposed sides of the attachment portion. Barb 35 may be configured to extend from the plane of the attachment portion.

FIGS. 4A and 4B show another tag 36, The tag 36 has a body 37 and an attachment portion 38. The attachment portion 38 is provided with barbs 39 and 40 located on opposed side edges of the body portion. As shown in FIG. 4B, the barbs 39 and 40 are configured to extend out of the plane of the attachment portion 38.

FIGS. 5A and 5B show another tag 41. The tag 41 has a body 42 and an attachment portion 43. The attachment portion has an angled end 44 terminating in a sharp end 45. A plurality of barbs 46 and 47 are formed in opposed edges of the attachment portion and as shown in FIG. 5B, these barbs are configured to extend out of the plane of the attachment portion.

FIGS. 6A and 6B show another tag 50. The tag 50 has a body 51 and an attachment portion 52. The attachment portion has an angled end 53 terminating in a sharp end 54. The attachment portion 52 is provided with a plurality of barbs 55 and 56 located along opposed directions thereof. In addition to this, two barbs 57 are formed between the opposed edges of the body portion by V-shaped slits formed in that portion. As shown in FIG. 6B, in this embodiment, the barbs are initially located in the plane of the attachment portion 52.

FIG. 7A shows a tag 60 having a body 61 and an attachment portion 62. The portion 62 has a rounded free end 63 and is provided with a plurality of barbs 64 and 65 on opposed side edges of the attachment portion. As shown in FIG. 7B, the tag may be planar or alternatively, as shown in FIG. 7C, the attachment portion may be articulated and have two parts 66 and 67 which project at angles and out of the body 61.

FIG. 8A shows a tag 70 having a body 71 and an attachment portion 72. The attachment portion has a rounded free end 73 and is provided with barbs 74 and 75 along opposed edges thereof. In addition to having barbs 74 and 75, the attachment portion is provided with a barb 76 located between the side edges of the attachment portion. As shown in FIG. 8B, the barb 76 may extend outwardly of the plane of the attachment portion.

FIG. 9A of the drawings shows a tag 80 having a body 81 and an attachment portion 82 with a rounded free end 83. The attachment portion is provided with barbs 84 and 85 on opposed edges thereof, and has two barbs 86 and 87 located between opposed edges of the attachment portion 82. As shown in FIG. 9B, the barbs 86 and 87 may extend from the plane of the attachment portion.

The tag of the invention may be made from any suitable material For example, the tag may be made from plastic or a food grade plastic if required, cloth, collagen, metal or gelatin.

FIG. 10A shows an object such as a hide or skin 90 to which a tag 100 of the invention is secured. The hide 90 is provided with a slit 101 and the tag is inserted into the slit 101, and the tag is then partially withdrawn to allow the barbs on the attachment portion 102 to anchor relative to the hide 90. In this way, the tag remains embedded within the hide 90 for normal operating conditions. The slit 101 is formed in a face of the hide 90. It is possible however to remove the tag entirely from the hide by the application of sufficient force. Since the tag is embedded within the hide, it is possible to subject the hide to defleshing without the need for removing the tag or having the tag become dislodged from the hide during the defleshing operation or other processing of the hide.

Figure 10B:
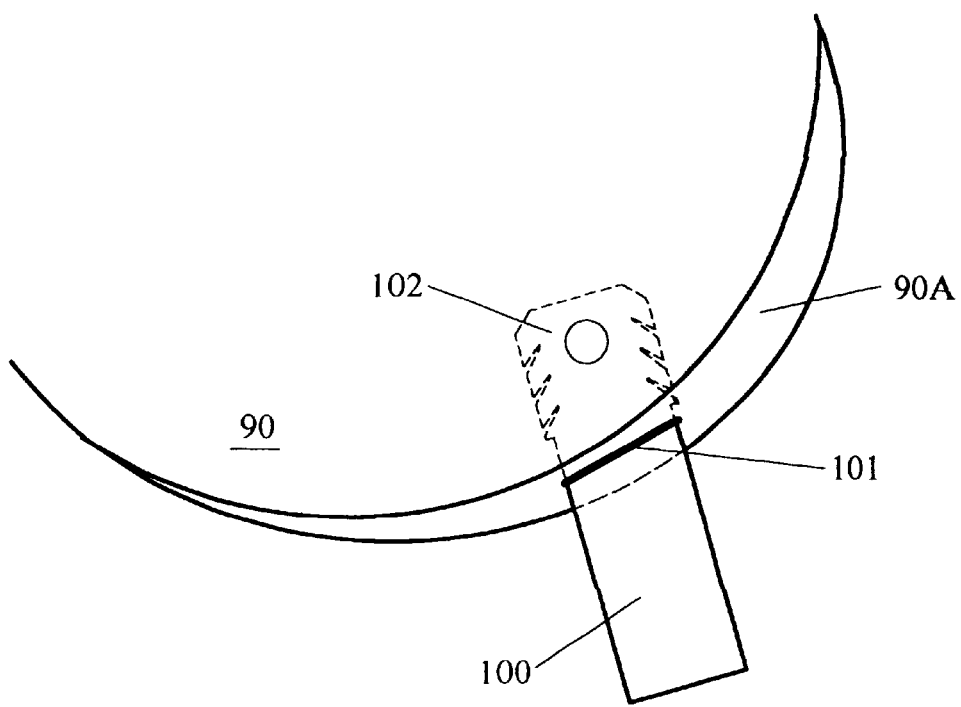
FIG. 10B is a perspective view of an alternative way in which a tag may be secured to a skin or hide.

In FIG. 10B, the hide 90 has an edge 90A and the slit 101 is formed in that edge.

The tag may be secured to the object such as a hide 90 in a manual or mechanical process, and a tool may be used to assist in the attachment of the tag to the object. The object to which the tag is to be secured may be preslit to allow the tag to be secured or alternatively, may be slit by the insertion tool.

Figure 11B:
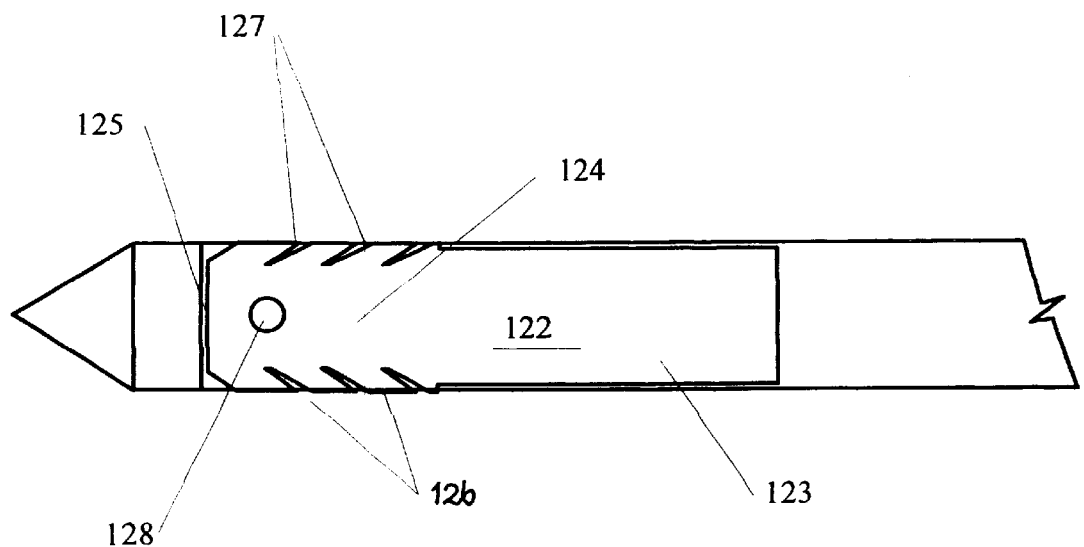
FIG. 11B shows a plan view of the tool of FIG. 11A with a tag releasably held by the tool.
Figure 11A:
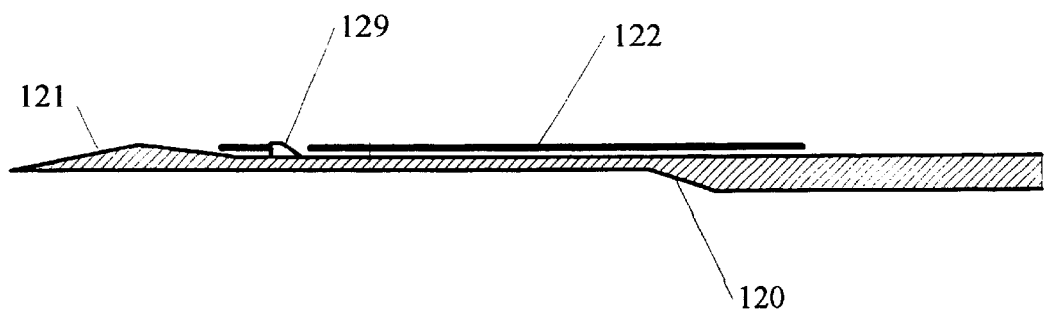
FIG. 11A shows a sectional view through a tag inserting tool according to an embodiment of the invention.

FIGS. 11A and 11B show a tag inserting tool which may be used to anchor a tag such as that shown in FIGS. 10A and 10B relative to an object. The tool 120 has a leading edge configured into a blade 121. This blade may be employed to form a slit in an object relative to which the tag 122 may be anchored. In this embodiment, the tag 122 has a body portion 123 and an attachment portion 124. The attachment portion is provided with a flat free end 125 and barbs 126 and 127 on opposed side edges thereof. The attachment portion has a hole 128 adapted to receive a locating member or pin 129 projecting from the tool 120. The pin normally locates within the hole 128 to releasably hold the tag relative to the tool 120. When the tool is inserted into the object to form a slit, the tag 123 is carried with it, and remains within the slit upon withdrawal of the tool. The pin 129 has a trailing ramped portion which allows for this operation.

Figure 12B:
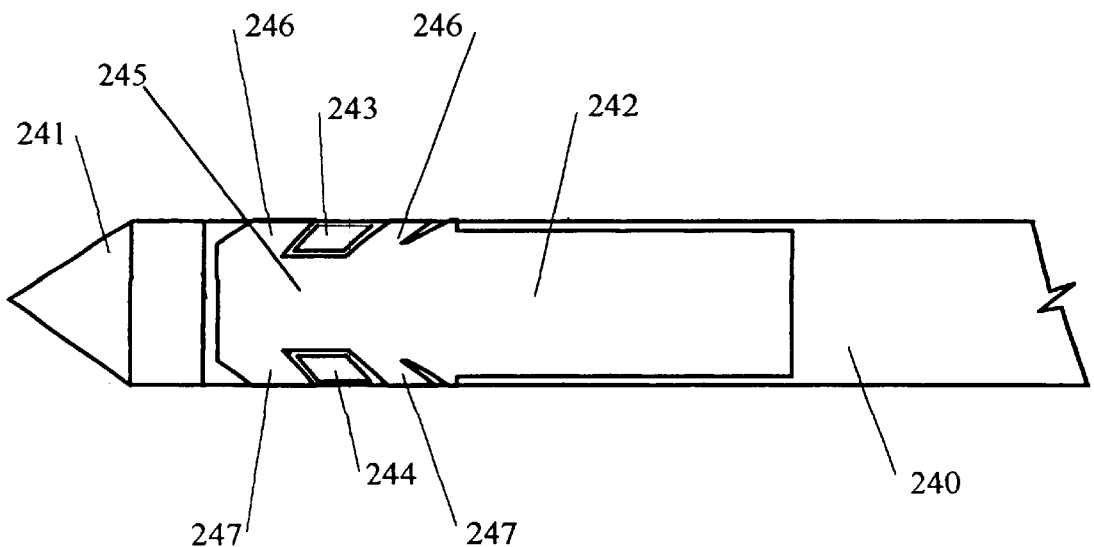
FIG. 12B shows a plan view of the tool of FIG. 12A with a tag releasably held by the tool.
Figure 12A:
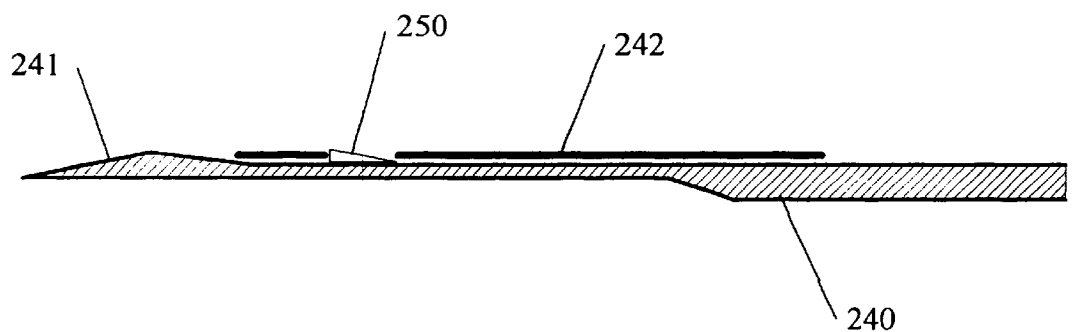
FIG. 12A shows a sectional view through an alternative tag inserting tool of an embodiment of the invention.

FIGS. 12A and 12B show a tag inserting tool according to another embodiment of the invention. The tool 240 has a blade 241 at its lead edge. This blade may be used to form a slit in an object relative to which the tag 242 may be anchored. The tool 240 has two projections 243, 244. The tag 242 has an attachment portion 245 with opposed barbs 246, 247 and a body portion for carrying indicia. Projections 243 and 244 locate between adjacent barbs 246 and 247 and releasably hold the tag to the tool to allow the tag to be anchored to an object. The projections have a ramped trailing edge 250 which allows the tool to be separated from the tag 242 after the tag is anchored in position.

Figure 13:
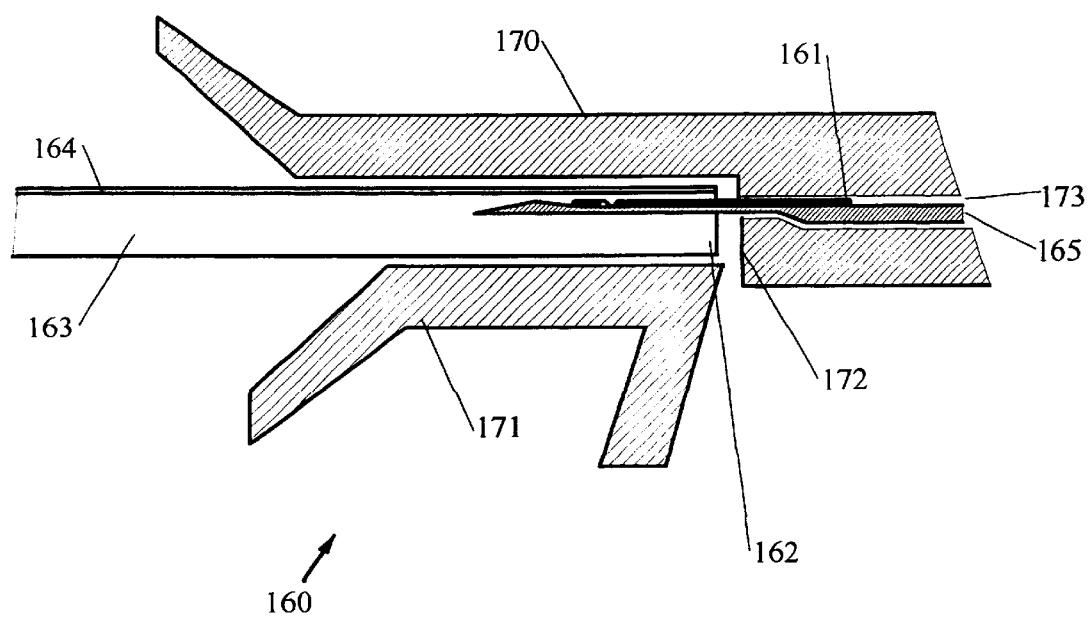
FIG. 13 shows sectional view of an apparatus for inserting a tag into a hide.

FIG. 13 shows an apparatus 160 for inserting a tag 161 into an edge 162 of a hide 163. The tag 161 is inserted closer to the fur side 164 of the hide 163 than the opposite side of the hide. A tool 165 like that shown in FIGS. 11A and 11B is used. The apparatus has two blocks 170, 171 between which the hide 163 may be clamped. Block 170 has a shoulder 172 and a passage 173 for receiving the tool 165.

The blocks 170 and 171 are moved apart and hide 163 is placed between them until an edge of the hide 163 abuts or is closely adjacent the shoulder 172. The blocks are then moved relative towards one another to securely clamp the hide between the blocks. Tool 165 is inserted into the passage 173 and into the edge 162 of the hide. The tool is then withdrawn and the tag remains secured to the hide. The blocks are then moved apart and the hide 163 is then removed from the apparatus.

Figure 14:
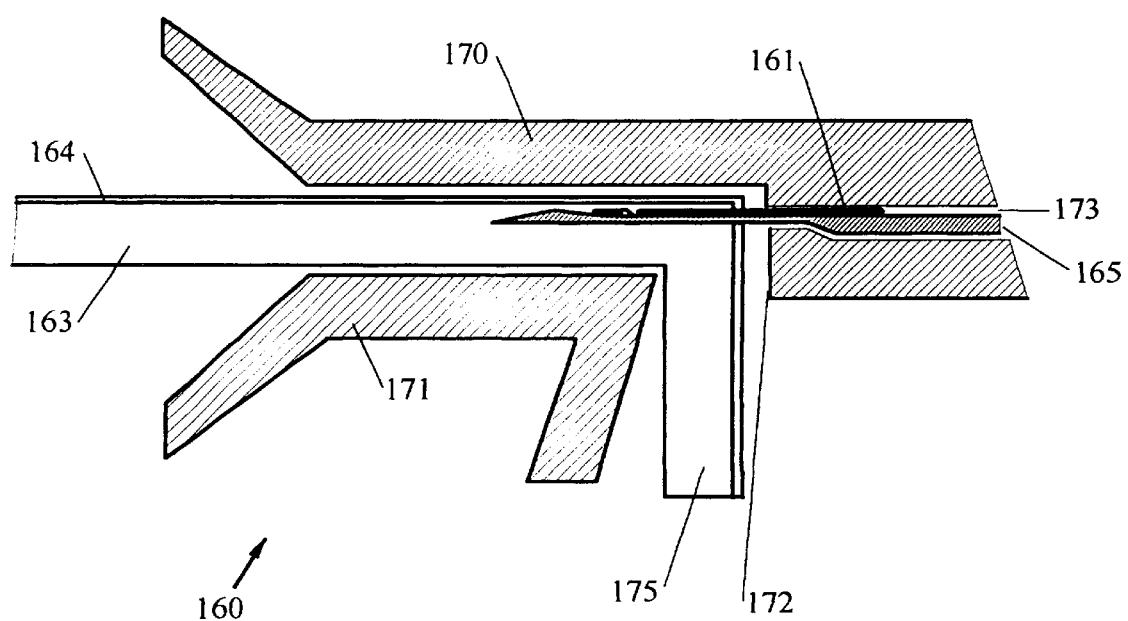
FIG. 14 shows a sectional view of the apparatus of FIG. 13 used in an alternative way to insert a tag into a hide.

FIG. 14 shows the same apparatus as that shown in FIG. 13. In this figure, the tag 161 is inserted into a face of the hide 163 rather than an edge.

With the embodiment of FIG. 14, the blocks 170, 171 are moved apart and the hide 163 is inserted between them with an edge portion 175 of the hide projecting downwardly past the shoulder 172. The blocks 170, 171 are then brought together to clamp the hide between them. The tool 165 is inserted into passage 173 and into the hide. The tool is then withdrawn and the tag 161 is left behind securely inserted into the hide. The blocks 170, 171 are then separated and the hide may then be removed.

Figure 15:
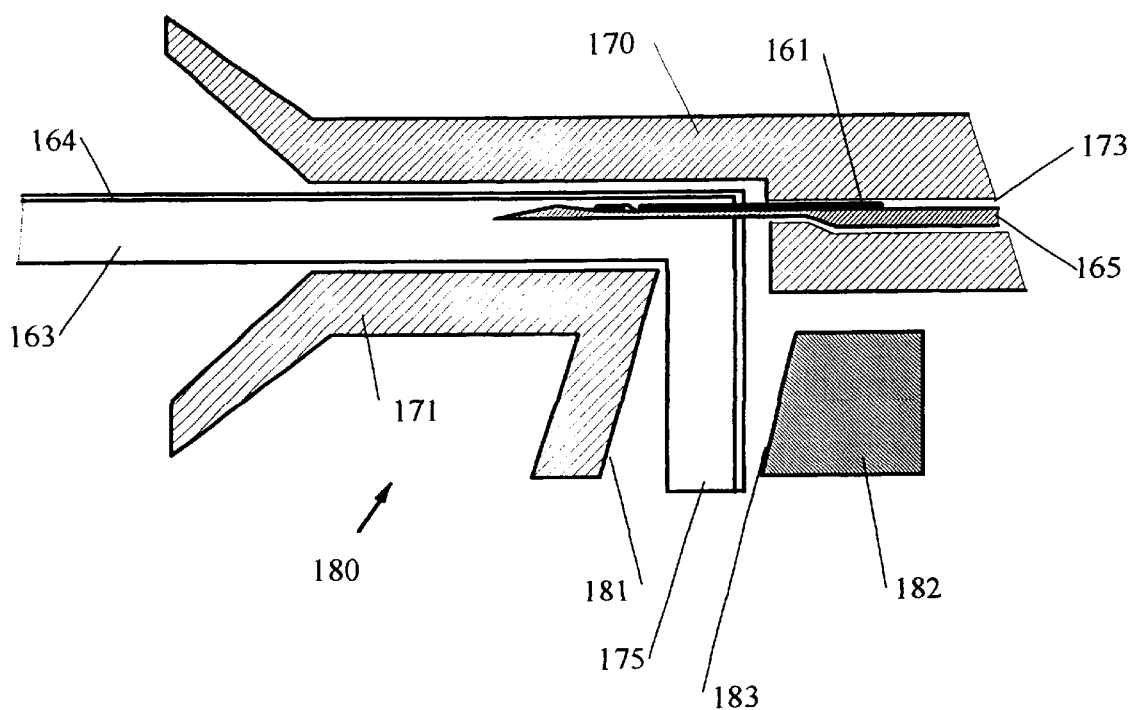
FIG. 15 is a sectional view of an alternative tool for inserting a tag into a hide according to another embodiment of the invention; and, FIGS. 16A to 20B are front elevational and side elevational views of tags according to further embodiments of the invention.

FIG. 15 shows an alternative apparatus 180 to that shown in FIGS. 13 and 14. The apparatus 180 has components in common with the apparatus of FIGS. 13 and 14 and those components are given reference numerals identical to those used in relation to FIGS. 13 and 14.

Block 171 has a downwardly and forwardly directed support flange 181. A clamping block 182 is located adjacent flange 181. Block 182 has an inclined leading face 183. In use blocks 170, 171 are moved apart relative to one another and a hide 163 is placed between them with a portion 175 of the hide extending downwardly between block 182 and the flange 181. The block 182 is moved relative to flange 181 to clamp the hide 163 between them. The hide is then pulled from apart spaced from portion 175 and placed under tension before the blocks 170, 171 are moved relative to one another to clamp the hide between them. Tool 165 with a tag 161 carried by it is then inserted into the passage 173 and into the hide. The tool is withdrawn and the tag remains firmly secured to the hide. The blocks may then be moved apart and the hide removed from the apparatus.

FIGS. 16A and 16B show a tag 190 having an attachment portion 191 formed as a separate component to the body portion 192. The portion 191 has an aperture 193 and opposed barbs 194, 195. A slot 196 extends through portion 191 and the body portion is threaded through the slot as shown in FIG. 16B. The body portion 192 may be secured to the attachment portion with an adhesive or by welding after it has been threaded through the slot 196. The portion 192 may be made of relatively thin flexible material such as plastic or woven fabric whilst the attachment portion may be made of relatively rigid material such as plastic.

In FIGS. 17A and 17B, the tag 200 has an attachment portion 201 of relatively rigid plastic material. The portion 201 has an aperture 202 and opposed barbs 203, 204. Body portion 205 is attachment to portion 201 in any suitable way and is substantially thinner and more flexible than portion 201.

FIGS. 18A and 18B show a tag 210 of constant thickness and the whole of the tag is made of relatively rigid plastics material. The tag 210 has an attachment portion 211 and a body portion 212. The portion 211 has an aperture 213 and opposed barbs 214, 215.

The tag 220 of FIGS. 19A and 19B is substantially identical to the tag of FIGS. 18A and 18B except that body portions 221 is thinner than attachment portion 222.

The tag 230 of FIGS. 20A and 20B has an attachment portion 231 and a body portion 232 of identical thickness. Attachment portion 231 has a barb 233 between its edges as well as opposed barbs 234 and 235 on its edges.

What is claimed is:

1. A method of securing a tag to an object, the tag having a body portion adapted to carry indicia either preprinted onto the body portion or applied to the body portion once the tag is attached to an object, the tag having an attachment portion coplanar with and at one end of the body portion, the attachment portion having at least one barb extending therefrom for allowing the tag to be secured to the object with the attachment portion embedded into the object and retained completely within the object; the method including supporting the object against movement, providing a slit in the object to which the tag is to be inserted, inserting the attachment portion of the tag into the slit such that said attachment portion remains substantially coplanar with said body portion, and slightly withdrawing the tag from the slit so that the barb engages the object to anchor the tag to the object.

2. The method of claim 1 wherein the slit is formed in an edge of the object.

3. The method of claim 1 wherein the slit is formed in a side face of the object.

4. A tag having a body portion adapted to carry indicia either pre-printed onto the body portion or applied to the body portion once the tag is attached to an object, the tag having an attachment portion coplanar with and at one end of the body portion, the attachment portion having an aperture intended to be engaged by an applicator tool and a series of barbs extending from and along at least one edge of the attachment portion for allowing the tag to be secured to the object with the attachment portion imbedded into and retained completely within the object, said attachment portion and body portion remaining substantially coplanar when embedded into said object.

5. The tag of claim 4 wherein the attachment portion is thicker than the body portion.

6. The tag of claim 4 wherein the body portion is separate from the attachment portion and the attachment portion is secured to the body portion.

7. The tag of claim 6 wherein the attachment portion has a slot for receiving the body portion.

8. The tag of claim 4 wherein the attachment portion has opposed edges and a plurality of barbs extending from both said opposed edges of the attachment portion.

9. The tag of claim 8 including at least one said barb extending from the attachment portion between the edges of the attachment portion.

\* \* \* \* \*